United States Patent Office 2,894,651
Patented July 14, 1959

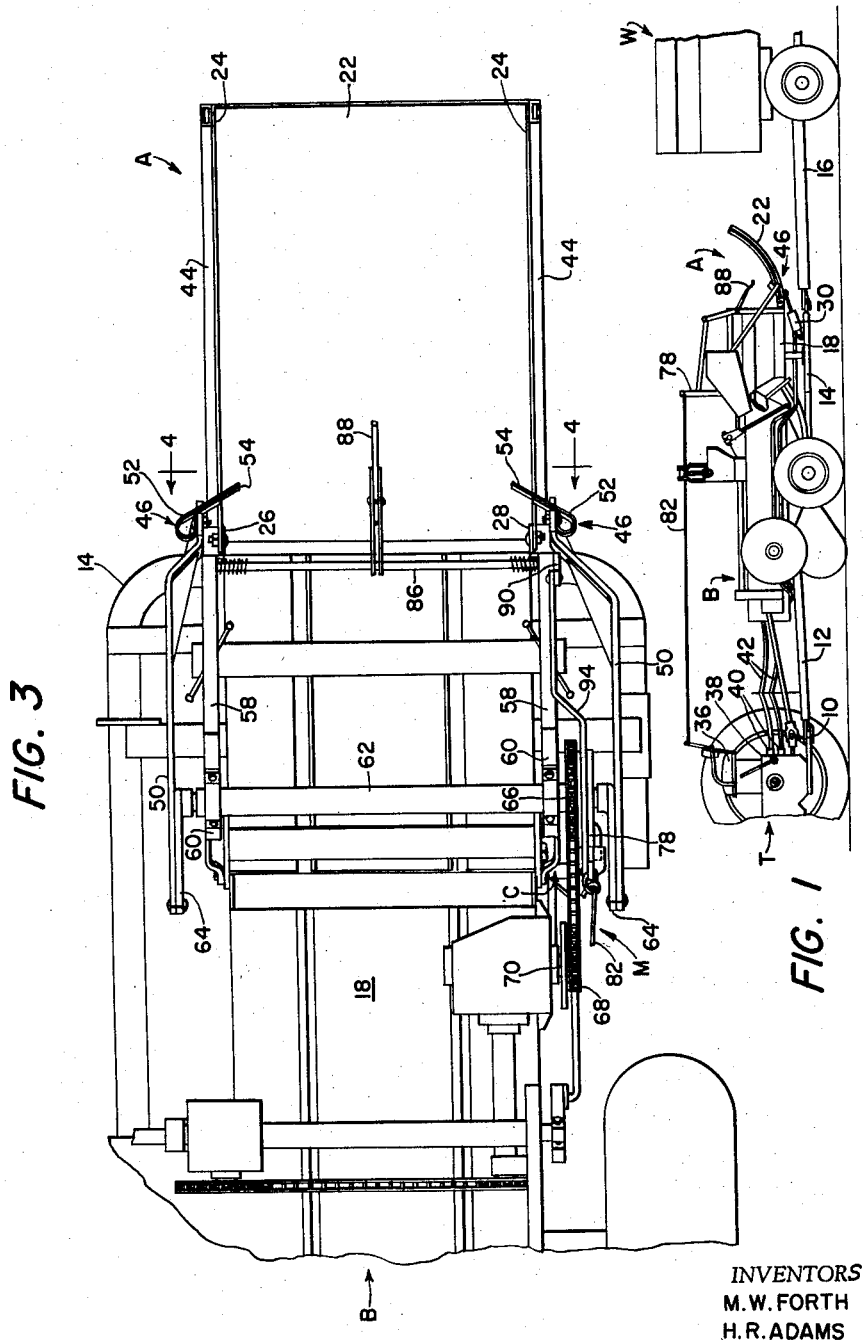

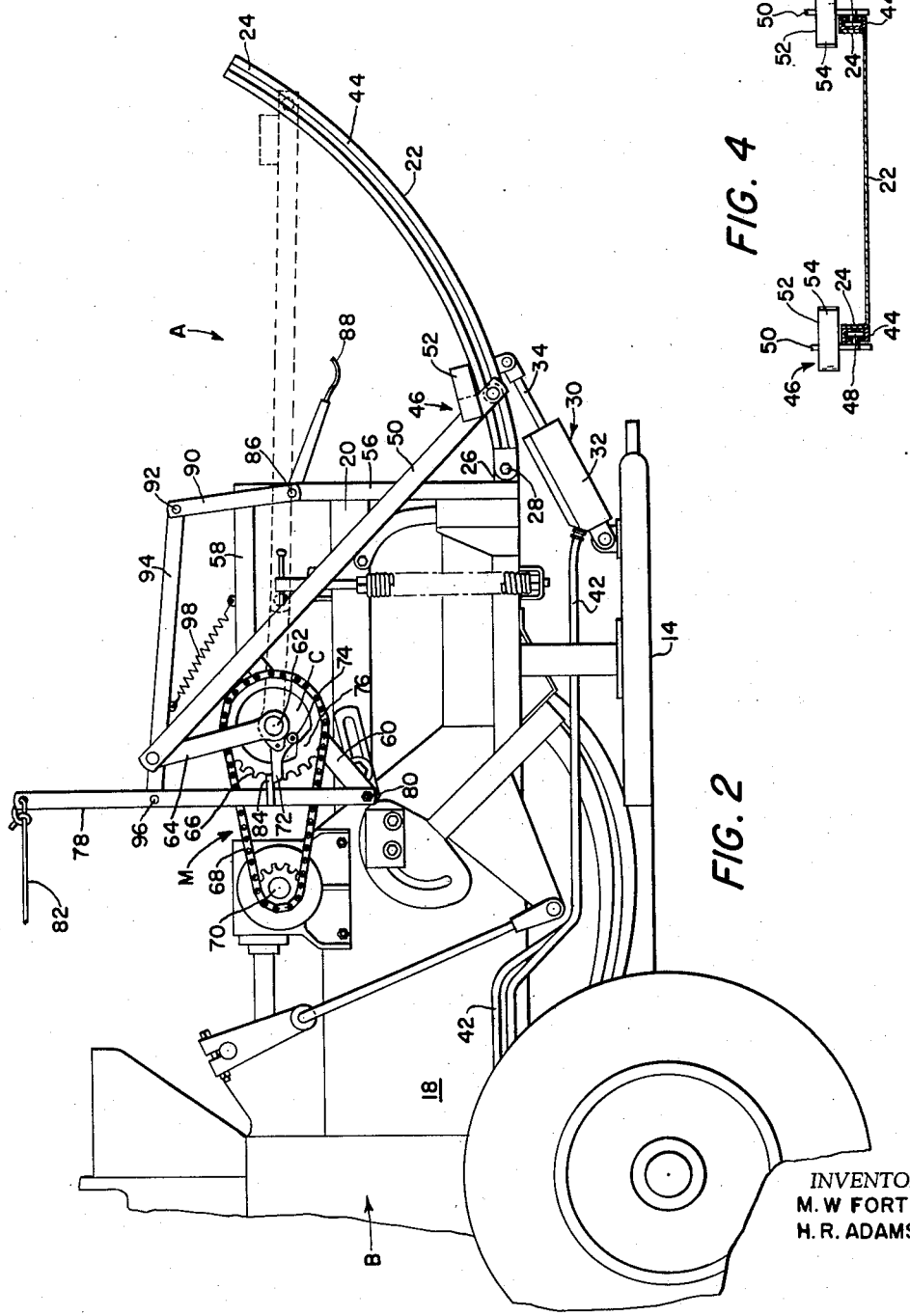

2,894,651

BALE THROWER VARIATIONS

Murray W. Forth and Harvey R. Adams, Moline, Ill., assignors, by mesne assignments, to Deere & Company, a corporation of Delaware Application December 6, 1957, Serial No. 701,039

17 Claims. (Cl. 214—83.3)

This invention relates to a material-handling apparatus and more particularly to a machine adapted for use in conjunction with an agricultural baler for the purpose of receiving bales from the baler and throwing them to a trailing or otherwise associated vehicle.

The invention has for a principal object the provision of a variation of the apparatus forming the subject of the U.S. Patent to Morrison 2,756,865 and aims in one respect to provide a machine having a lower silhouette, together with means for adjusting the throwing apparatus so as to vary the trajectory and thus the point of ultimate discharge of the bales. Still further, the invention embodies remote control means for varying the trajectory of the bale discharge, the use of track-guided bale-throwing elements, and novel means for driving the throwing elements.

The foregoing and other important objects and desidable features inherent in and encompassed by the invention will become apparent as a preferred embodiment thereof is disclosed in detail in the ensuing description and accompanying sheets of drawings, the several figures of which are described immediately below.

Fig. 1 is a side elevational view, on a materially reduced scale, showing a vehicle train made up of a tractor, a baler and a trailer or wagon.

Fig. 2 is an enlarged fragmentary side elevational view disclosing the details of the throwing mechanism.

Fig. 3 is a plan view of the structure shown in Fig. 2.

Fig. 4 is a transverse section as seen on line 4—4 of Fig. 3.

The representative vehicle train shown in Fig. 1 is made up of a typical agricultural tractor T, a baler B and a wagon W. The tractor has a conventional drawbar 10 and the baler includes a forwardly extending tongue 12 connected to the drawbar and a rear wagon hitch 14 to which the tongue 16 of the trailing wagon is connected. The baler further has a fore-and-aft elongated bale case 18 in which bales are successively formed and tied in any conventional manner and are then ejected at the rear end to be received by the bale-throwing apparatus, indicated in its entirety by the letter A, which apparatus performs cyclically to throw bales in succession rearwardly and upwardly into the wagon W.

The rear end part of the bale case 18 affords a bale-discharge portion 20 from which individual bales emerge in succession as the baler operates, the function of the baler in this respect being well-known and therefore assumed to be familiar to those versed in the art. The apparatus is preferably afforded as an attachment for existing balers; although, the possibility of building the apparatus directly onto balers in the first place is not excluded. Considered as an attachment, however, for purposes of the present description, it will be seen that appropriate supporting structure, to be described in detail hereinafter, is provided, together with means for mounting this structure on the baler. Part of the apparatus includes means in the form of an upwardly curved chute 22 for receiving and supporting the bale from the discharge portion 20, this chute having opposite sides 24 respectively flanking the received bale and extending rearwardly and upwardly or generally in the direction in which the bale is ultimately thrown. Mounting of the chute on the bale-discharge portion 20 is accomplished by suitable bracket means 26 including a pivot 28 on a transverse axis. The chute is consequently mounted on the pivot for swinging vertically, which therefore effects changes in the position of the discharge end of the chute so as to vary the trajectory of the bale as it is thrown to the trailing wagon. Any selected position of the chute is secured by adjusting means, here in the form of a hydraulic motor unit 30 of the cylinder and piston type. The cylinder 32 of this unit is connected to the wagon hitch 14 and the piston is connected to the chute, from which it will be seen that extension or retraction of the unit 30 accomplishes the adjustment as described above.

It is a feature of the invention that the unit 30 can be operated from a position remote therefrom, in this instance from the operator's seat 36 on the tractor. The tractor is equipped with a hydraulic power adjusting system of the type shown, for example, in the U.S. Patent to Jirsa et al. 2,532,552 and, as typical of such arrangement, the present tractor T has a rear power lift housing 38 affording a pair of remote hydraulic cylinder connections 40. The hydraulic cylinder unit 30 is of the two-way type and has a pair of hoses or equivalent flexible conduits 42 connected respectively to the outlets or remote cylinder connections 40 on the tractor. Accordingly, operation of the power lift system 38 by the valve lever V will, through the hose connections and hoses 40 and 42, serve selectively to achieve extension or retraction of the cylinder unit to vary the angle of the chute 22. When the control valve (not shown) for the system is in its neutral position, the cylinder unit is hydraulically locked and the position of the chute is fixed.

Each flanking side 24 of the chute 22 mounts thereon and coextensively therewith a channel 44 which affords track means for carrying a bale-throwing element 46. Each element in this instance comprises a roller 48 running in the associated track 44 and mounted on the rear lower end of an operating link 50. The lower end of each link 50 has rigidly secured thereto a bale gripper 52 configured as shown best in Fig. 3 so that the grippers enable receipt therebetween of the emerging bale in such manner that the terminal inner portions 54 of the grippers bite into the bale when the elements 46 are moved rearwardly in unison. The configuration of the grippers also enables the bale to escape rearwardly and upwardly from the grippers when the grippers are decelerated, in a manner that will be presently described.

It was previously described that the apparatus is here afforded as an attachment including certain supporting structures. Part of this structure is the bracket means 26 for mounting the chute 22, and additional parts are upright rear frame elements 56, opposite fore-and-aft frame elements 58 and forwardly and downwardly extending frame elements 60, all of which are appropriately secured to the bale case as by bolts and the like (not shown). Suffice it to note that any type of fastening means may be used so long as a rigid mounting is afforded. The frame structure thus effected serves to carry a transverse crank shaft 62 which is part of power operated mechanism M having a driving connection to the bale-throwing elements 46 and functioning between a demobilized status and a mobilized status to operate in a cycle for affording successive acceleration and deceleration of the bale-throwing elements on their throwing strokes as they move from the full-line position in Fig. 2 to the broken-line position of that figure, and for acceleration and deceleration on return to their full-line positions.

The crank shaft 62 has rigidly secured to its opposite ends a pair of crank arms 64 which are connected at their terminal ends respectively to the driving links 50. The crank shaft 62 is normally idle, which represents the demobilized status of the mechanism, and mobilization thereof is effected cyclically by a one-revolution clutch C of any conventional construction, here shown as comprising a constantly rotating part or sprocket 66 and an intermittently rotating part represented by the crank shaft 62. The sprocket is chain driven at 68 from any suitable power shaft on the baler, such as the shaft 70. The details of the drive are not important except that a cyclic drive such as the one-revolution clutch C is desirable. A clutch dog 72 is pivoted eccentrically on the crank shaft 62 and has a drive portion 74 engageable with and disengageable from a hump or drive part 76 on the constantly rotating part or sprocket 66. As is typical in clutches of this type, the dog 72 is biased in a clockwise direction so that the drive portion or roller 74 is in a position to be engaged by the hump 76, in which case the sprocket 66 and crank shaft 62 will rotate as a unit. When the dog is disengaged, the sprocket can rotate without driving the crank shaft 62. For this purpose, means is provided for effecting disengagement of the dog 72, and in this case this means takes the form of a control lever 78, pivoted at its lower end at 80 to the bale case or to the supporting structure 60 and connected at its upper end to a pull rope 82 which extends forwardly to the tractor so as to be convenient to the tractor operator. A lug 84, rigid on the lever 78, interposes an obstacle to the clutch dog 72 so as to hold it in the disengaged position of Fig. 2. When the lever is displaced forwardly, the lug 84 clears the clutch dog 72 and the bias applied to the clutch dog causes the roller 74 to become located in the path of the hump 76, whereby the sprocket 66 and crankshaft 62 will rotate in unison.

The control lever 78 can be manually operated by the pull rope 82, as already indicated, but is preferably operated automatically by the presence of an emerging bale onto the bale-receiving means or chute 22. For this purpose, the structure 56–58 carries a transverse rockshaft 86 on which is rigidly mounted a bale-sensing means or feeler 88. The rockshaft 86 has rigidly connected thereto an upstanding arm 90 which is pivotally connected at 92 to a forwardly extending link 94 which is in turn pivotally connected at 96 to the lever 78. A tension spring 98 normally operates to hold the lever 78 rearwardly so as to effect disengagement of the clutch C and to bias the feeler 88 to the position shown in Fig. 2. When a bale emerges from the bale-discharge end 20 of the baler B and onto the chute 22, it displaces the feeler 88 upwardly, which effects counterclockwise rocking of the rockshaft 86 an this in turn acts through the arm 90 and link 94 to displace the control lever 78 forwardly against the tension of the spring 98, thus removing the lever-mounted lug 84 from the clutch dog 72 and enabling biased engagement of the clutch for one revolution, during which one revolution the bale-throwing elements 46 are accelerated to the dotted line position and are returned to the full-line position, it being understood that the bale that initially displaced the feeler 88 has now been thrown upwardly and rearwardly to the wagon so that the feeler 88 returns via the spring 98 to its normal position, thereby returning the lever 78 to its rearward position so that the lug 84 thereon is again in the path of the clutch dog 72, whereupon as the clutch finishes its one revolution the dog is engaged by the lug and the roller 74 becomes disengaged from the constantly rotating part hump 76, this part thus being able to continue rotating while the crank shaft 62 is demobilized.

It is inherent in the cyclic operation of the clutch C that the movement of the bale-throwing elements 46 from the full line position of Fig. 2 to the dotted line position of that figure entails acceleration and then deceleration. Upon deceleration, the carried bale automatically releases itself from the grippers 52 and the momentum of the bale carries it rearwardly to the wagon. Of course, successive acceleration and deceleration of the bale-throwing elements will occur on their return strokes, or on the movement thereof from the dotted line position of Fig. 2 to the full line position.

As already indicated, should it be desired to vary the trajectory of the thrown bales the cylinder unit 30 can be retracted from its maximum position of Fig. 2 so as to lower the chute 22, whereby the trajectory becomes "flatter."

A brief resume of the operation follows: Bales are formed in the baler as in the conventional manner and successively emerge from the bale-discharge portion 20 as individual increments. As each bale emerges, it enters between the grippers 52 of the throwing elements 46 and ultimately displaces the feeler 88 upwardly to trip the clutch C, whereupon the drive is mobilized and the bale-throwing elements are activated to travel to the dotted line position of Fig. 2 for effecting ultimate discharge of the bale upwardly and rearwardly to the trailing wagon, followed by return of the elements 46 to their starting position as the clutch completes its one revolution. This cyclic operation will continue as long as bales are individually discharged from the bale case discharge portion 20.

One advantage of the present invention is that the silhouette of the machine is lowered in view of the fact that the track means enables carrying of the elements 46 along an arcuate path independently of pivotal mounting as in the Morrison patent noted above. Another feature is the adjustability of the chute 22 and a subsidiary feature is the remote control of this adjustment by the tractor power lift system as already described.

Features and advantages not categorically enumerated will undoubtedly occur to those versed in the art, as will many modifications and alterations in the preferred embodiment disclosed, all of which may be achieved without departure from the spirit and scope of the invention.

What is claimed is:

1. For a baler having bale-forming means including a bale-discharge portion from which individual bales emerge in succession as the baler operates: bale-throwing apparatus for throwing each emerging bale distantly from the bale-discharge portion of the baler, comprising supporting structure having means thereon for connection thereof to the baler; means at and for receiving and supporting a bale from the discharge portion and having opposite side portions respectively flanking the received bale and extending generally in the direction in which the bale is ultimately thrown; track means on and along said side portions; a pair of bale-throwing elements, one for each track means and said elements respectively having thereon track followers engaged by the respective track means so as to confine the elements against relative lateral displacement and to compel said elements to run lengthwise of said track means on a throwing stroke from a starting position proximate to said discharge portion and on a successive return stroke back to said starting position; power-operated mechanism on the supporting structure and including a driving connection to the bale-throwing elements, said mechanism having a demobilized status while said elements are in their starting positions and being mobilizable for cyclic operation terminated by said demobilized status for affording successive acceleration and deceleration of the bale-throwing elements on their throwing strokes and successive acceleration and deceleration of said elements on their return strokes; bale-engaging means respectively on said elements for receiving and engaging an emerging bale, said bale-engaging means being releasable when said elements reach a substantially high velocity on their throwing strokes to enable departure of the bale beyond said elements; and control means for effecting mobilizing and demobilizing of the power-operated mechanism, including a bale-sensing device operative automatically, in response to a bale-forming condition including emergence of a bale to the bale-receiving means, to mobilize the mechanism for cyclic operation thereof.

2. For a baler having bale-forming means including an upper portion and a lower bale-discharge portion spaced below said upper portion and from which individual bales are discharged in succession as the baler operates: bale-propelling apparatus comprising supporting structure having means thereof for connection thereof to the baler and including an upper part disposed closely above said upper portion of the bale-forming means; bale-moving means carried by the supporting structure and including a bale support leading from the bale-discharge portion in the direction of ultimate delivery of the bale; track means on and along the support and a bale-moving element supported by the track means independently of the supporting structure and running in the track means for travel from a starting position adjacent to the bale-discharge portion to a delivery position relatively remote from said portion; successively accelerative and decelerative power means mounted closely above the upper portion of the bale-forming means substantially at the level of the upper part of the supporting structure and connected to and for energizing the bale-moving element to travel toward its delivery position in successive accelerative and decelerative phases; and releasable bale-engaging means on the bale-moving element for engaging a discharged bale in the starting position of said bale-moving element and for carrying the bale toward said delivery position, said bale-engaging means being releasable from the bale upon deceleration of the bale moving element to cause the momentum of the bale to carry it beyond said delivery position.

3. For a baler having bale-forming means including an upper portion and a lower bale-discharge portion spaced below said upper portion and from which individual bales are discharged in succession as the baler operates: bale-propelling apparatus comprising supporting structure having means thereon for connection thereof to the baler and including an upper part disposed closely above said upper portion of the bale-forming means; bale-moving means carried by the supporting structure and including track means leading from the bale-discharge portion in the direction of ultimate delivery of the bale and a bale-moving element supported by the track means independently of the supporting structure and running in the track means for travel from a starting position adjacent to the bale-discharge portion to a delivery position relatively remote from said portion; successively accelerative and decelerative power means mounted closely above the upper portion of the bale-forming means substantially at the level of the upper part of the supporting structure and connected to and for energizing the bale-moving element to travel toward its delivery position in successive accelerative and decelerative phases; and releasable bale-engaging means on the bale-moving element for engaging a discharged bale in the starting position of said bale-moving element and for carrying the bale toward said delivery position, said bale-engaging means being releasable from the bale upon deceleration of the bale-moving element to cause the momentum of the bale to carry it beyond said delivery position.

4. For a baler having bale-forming means including a generally horizontal bale-discharge portion from which individual bales emerge in succession as the baler operates: bale-throwing apparatus for throwing each emerging bale distantly from the bale-discharge portion of the baler, comprising supporting structure having means thereon for connection thereof to the baler; means at and for receiving and supporting a bale from the discharge portion and having opposite side portions respectively flanking the received bale and extending generally in the direction in which the bale is ultimately thrown; means hingedly supporting the bale-receiving means at said discharge portion for vertical swinging adjustment to vary its angle to the horizontal relative to said discharge portion; means for selectively fixing an adjusted angular position of said bale-receiving means; track means on and along said side portions; a pair of bale-throwing elements, one carried by each track means to run lengthwise of said track means on a throwing stroke from a starting position proximate to said discharge portion and on a successive return stroke back to said starting position; power-operated mechanism on the supporting structure and including a driving connection to the bale-throwing elements, said mechanism having a demobilized status while said elements are in their starting positions and being mobilizable for cyclic operation terminated by said demobilized status for affording successive acceleration and deceleration of the bale-throwing elements on their throwing strokes and successive acceleration and deceleration of said elements on their return strokes; bale-engaging means respectively on said elements for receiving and engaging an emerging bale, said bale-engaging means being releasable when said elements reach a substantially high velocity on their throwing strokes to enable departure of the bale beyond said elements; and control means for effecting mobilizing and demobilizing of the power-operated mechanism, including a bale-sensing device operative automatically, in response to a bale-forming condition including emergence of a bale to the bale-receiving means, to mobilize the mechanism for cyclic operation thereof.

5. The invention defined in claim 4, in which: the means for selectively fixing the position of the bale-receiving means includes a remote control device for operating same distantly therefrom.

6. The invention defined in claim 4, in which: the means for selectively fixing the position of the bale-receiving means comprises a power-operated device.

7. The invention defined in claim 6, in which: said device includes a remote control device for operating same distantly therefrom.

8. For a baler having bale-forming means including a bale-discharge portion from which individual bales are discharged in succession as the baler operates: bale-propelling apparatus comprising supporting structure having means thereon for connection thereof to the baler; bale-moving means carried by the supporting structure and including a bale support leading from the bale-discharge portion in the direction of ultimate delivery of the bale; means mounting the bale support for adjustment relative to the discharge portion to vary the angle of said bale support and thus to vary the path of delivery of the bale; track means on and along the support and a bale-moving element running in the track means for travel from a starting position adjacent to the bale-discharge portion to a delivery position relatively remote from said portion; successively accelerative and decelerative power means connected to and for energizing the bale-moving element to travel toward its delivery position in successive accelerative and decelerative phases; and releasable bale-engaging means on the bale-moving element for engaging a discharged bale in the starting position of said bale-moving element and for carrying the bale toward said delivery position, said bale-engaging means being releasable from the bale upon deceleration of the bale moving element to cause the momentum of the bale to carry it beyond said delivery position.

9. The invention defined in claim 8, including: selective means for adjusting and securing the adjusted position of the bale support.

10. The invention defined in claim 9, in which: said selective means is power-operated.

11. The invention defined in claim 8, in which: said selective means includes control means operative from a position remote therefrom.

12. For a baler having bale-forming means including a bale-discharge portion from which individual bales are discharged in succession as the baler operates: bale-propelling apparatus comprising supporting structure having means thereon for connection thereof to the baler; bale-moving means carried by the supporting structure and including track means leading from the bale-discharge portion in the direction of ultimate delivery of the bale and a bale-moving element running in the track means for travel from a starting position adjacent to the bale-discharge portion to a delivery position relatively remote from said portion; successively accelerative and decelerative power means connected to and for energizing the bale-moving element to travel toward its delivery position in successive accelerative and decelerative phases; releasable bale-engaging means on the bale-moving element for engaging a discharged bale in the starting position of said bale-moving element and for carrying the bale toward said delivery position, said bale-engaging means being releasable from the bale upon deceleration of the bale-moving element to cause the momentum of the bale to carry it beyond said delivery position; and means mounting the track means for adjustment relative to the discharge portion to vary the angle of said track means and thus to vary the path of delivery of the bale.

13. The invention defined in claim 12, including: selective means for adjusting and securing the adjusted position of the track means.

14. The invention defined in claim 13, in which: said selective means is power-operated.

15. The invention defined in claim 14, in which: said selective means includes control means operative from a position remote therefrom.

16. For a baler having bale-forming means including a bale-discharge portion from which individual bales are discharged in succession as the baler operates: bale-propelling apparatus comprising supporting structure having means thereon for connection thereof to the baler; bale-moving means carried by the supporting structure and including a bale support leading from the bale-discharge portion in the direction of ultimate delivery of the bale; a bale moving element movable relative to the support for travel from a starting position adjacent to the bale-discharge portion to a delivery position relatively remote from said portion; successively accelerative and decelerative power means connected to and for energizing the bale-moving element to travel toward its delivery position in successive accelerative and decelerative phases; releasable bale-engaging means on the bale moving element for engaging a discharged bale in the starting position of said bale-moving element and for causing the bale to move toward said delivery position, said bale-engaging means being releasable from the bale upon deceleration of the bale moving element to cause the momentum of the bale to carry it beyond said delivery position; means mounting the bale support for adjustment relative to the discharge portion to vary the angle of said bale support and thus to vary the path of delivery of the bale; and power operated means for achieving adjustment of the bale support.

17. For a baler having bale-forming means including a bale-discharge portion from which individual bales are discharged in succession as the baler operates: bale-propelling apparatus comprising supporting structure having means thereon for connection thereof to the baler; bale-moving means carried by the supporting structure and including a bale support leading from the bale-discharge portion in the direction of ultimate delivery of the bale; a bale moving element movable relative to the support for travel from a starting position adjacent to the bale-discharge portion to a delivery position relatively remote from said portion; successively accelerative and decelerative power means connected to and for energizing the bale-moving element to travel toward its delivery position in successive accelerative and decelerative phases; releasable bale-engaging means on the bale moving element for engaging a discharged bale in the starting position of said bale-moving element and for causing the bale to move toward said delivery position, said bale-engaging means being releasable from the bale upon deceleration of the bale moving element to cause the momentum of the bale to carry it beyond said delivery position; means mounting the bale support for adjustment relative to the discharge portion to vary the angle of said bale support and thus to vary the path of delivery of the bale; and means for achieving adjustment of the bale support and including control means operative from a position remote from said bale support.

References Cited in the file of this patent

UNITED STATES PATENTS

| 2,785,811 | Forth | Mar. 19, 1957 |
| 2,792,680 | Edel | May 21, 1957 |